Patented June 15, 1954

2,681,292

UNITED STATES PATENT OFFICE 2,681,292

PROCESS FOR MAKING PILE-SURFACED MATERIAL

Henry Ewing, Spondon, near Derby, and John Surrage Blackmore, deceased, late of Spondon, near Derby, England, by Lily Jane Blackmore, Spondon, near Derby, and Midland Bank Executor and Trustee Company Limited, London, England, joint executors, assignors, by mesne assignments, to Celanese Corporation of America, a corporation of Delaware No Drawing. Application November 7, 1951,
Serial No. 255,310

Claims priority, application Great Britain
November 7, 1950

8 Claims. (Cl. 117—33)

This application is a continuation-in-part of application Serial No. 91,092, filed May 3, 1949.

This invention relates to textile fabrics and other materials and especially to pile surfaced materials containing cellulose acetate in the pile and/or in the backing.

It is known to make pile fabrics by bonding short textile fibres to a suitable backing, for example a textile fabric, the fibres being projected on to the adhesive-coated fabric, for example by blowing or by the action of an electrical field, and the adhesive being subsequently converted from the sticky condition to a non-sticky flexible condition. An important object of the present invention is to make pile fabrics of this kind containing cellulose acetate in the pile and/or in the backing, the said fabrics to have a soft handle, to be water-resistant and capable of resisting moderately elevated temperatures, for example up to 100° C., and being capable of dry cleaning without damage.

For making pile fabrics of the kind referred to containing cellulose acetate, great difficulty was experienced in devising a suitable adhesive composition. One quality most necessary in the adhesive is that it should be obtainable in a very sticky condition. Unfortunately the adhesives in which this characteristic is most marked are for the most part highly water-sensitive even in the hardened condition. Adhesives showing considerable stickiness can be formulated from rubber either in solution or in the form of latex but rubber shows no specific adhesive properties towards cellulose acetate and moreover is not resistant to dry cleaning solvents even when vulcanised. Polychloroprene shows the same disadvantages with less stickiness before hardening. Polyvinyl acetate can be used in solution or in dispersion, e. g. in a plasticiser or even in water, to formulate adhesives which are sufficiently sticky and which can be hardened to give a flexible coating. It has not, however, been found possible with polyvinyl acetate to obtain the desired soft handle in the product. Polyvinyl acetate is, moreover, defective in respect of resistance to elevated temperatures and to dry-cleaning solvents. The same lack of soft handle coupled with undue softening below 100° C. is obtained with polyvinyl chloride which, moreover, cannot readily be obtained in so sticky a condition as polyvinyl acetate and which needs special plasticisers, e. g. cyclohexyl phthalate, to give strong adhesion to cellulose acetate. The desired degree of stickiness is still more difficult to obtain with polymerised esters of acrylic acid and methacrylic acid. These polymers also are defective in resistance to dry-cleaning solvents. As is well known, the resistance to solvents of copolymers is usually relatively low, and various copolymers tried, including copolymers of vinyl acetate with vinyl chloride, proved unsuitable.

We have now found, however, that a suitable adhesive can be formulated from a rubber-like copolymer of butadiene with acrylonitrile that contains at least 20% by weight of combined acrylonitrile, for example, the polymers sold under the registered trade-marks "Hycar O. R. 25" and "Hycar O. R. 15." Such polymers, especially when plasticised, can be obtained in a highly sticky condition. By vulcanisation they can be converted into a coating which adheres extraordinarily well to cellulose acetate and which can be dry cleaned without damage. Moreover, such polymers can be applied in solution in a mixture of volatile higher ketones, e. g. methyl ethyl ketone in admixture with methyl isobutyl ketone or diethyl ketone, which does not damage the cellulose acetate. Products obtained by the use of this adhesive have shown an excellent soft handle.

According, therefore, to the process of the invention, pile surfaced materials are made by impelling fibres on to an adhesive-coated web and hardening the adhesive, the fibre and/or the web having a basis of cellulose acetate, the adhesive containing a rubber-like copolymer of butadiene and acrylonitrile which is vulcanised during the hardening step. The invention includes pile surfaced materials in which pile and/or backing are of cellulose acetate and in which the pile is anchored to the backing by a vulcanised rubber-like copolymer of butadiene and acrylonitrile containing at least 20% of combined acrylonitrile.

It is of advantage for the acrylonitrile content of the copolymer to be higher than 20%, e. g. 25 to 45% and especially 40 to 45%, the remainder being butadiene. Blends of two or more copolymers each having at least the minimum acrylonitrile content specified above, e. g. blends of a copolymer containing 20 to 25% with one containing 40 to 45% of acrylonitrile, can be used. It is also possible to use blends of the copolymer, especially a copolymer containing 40 to 45% of acrylonitrile, with a minor proportion of polyvinyl chloride.

Preferably the adhesive composition contains in addition to the polymer and the vulcanising ingredients at least one plasticiser for the synthetic rubber of low volatility, for example dibutyl phthalate or better still a higher phthalate, for instance di-2-ethyl-hexyl phthalate, or dicyclohexyl phthalate or tricresyl phosphate. In addition it is of advantage to have present a more volatile plasticiser of high solvent power for cellulose acetate, for example dimethyl phthalate, and, as in the process of our British Patent No. 644,002, this plasticiser may be to a large extent removed by volatilisation in the course of vulcanisation. To facilitate the evaporation of the more volatile plasticiser without undue loss of the less volatile one, the more volatile plasticiser should have at least 5 times, and preferably 10 to 50 times, the vapour pressure at 150° C. of the less volatile plasticiser and its vapour pressure at that temperature should not be less than 5 mm. The copolymer may be plasticised by a suitable polymeric plasticiser, e. g. a polyester such as poly-1.2-propylene glycol sebacate. It is also of advantage to have present an anti-oxidant, for example beta-phenyl naphthylamine, with a view to maintaining the stability of the polymer.

The following are examples of suitable adhesives according to the invention, all parts being by weight:

Example I 150 parts of "Hycar O. R. 25"
3 parts of sulphur
3 parts of a 4:1 mixture of mercaptobenzthiazole and diphenyl guanidine
7.5 parts of zinc oxide
37.5 parts of a cumarone resin of M. P. 130° C.
300 parts of dimethyl phthalate
45 parts of di-2-ethyl-hexyl phthalate
378 parts of methyl ethyl ketone
252 parts of methyl isobutyl ketone
3 parts of pigment

Example II 800 parts of "Hycar O. R. 15"
1600 parts of dimethyl phthalate
400 parts of di-2-ethyl-hexyl phthalate
80 parts of a resin of softening point 123° C. obtained by polymerisation of a petroleum cracking distillate in which none of the unsaturated constituents boils below 130° C., at least 70% of the total weight of the unsaturated constituents consists of one or both of the substances beta-methyl styrene and indene, and said total weight does not contain as much as 5% of any di-unsaturated substance
90 parts of zinc oxide
16 parts of sulphur
8 parts of stearic acid
2 parts of tetramethyl thiuram disulphide
8 parts of benzthiazyl disulphide
24 parts of yellow ochre
2560 parts of a 60:40 mixture (by volume) of methyl ethyl ketone and methyl isobutyl ketone

Example III

The composition is as in Example II except that the di-2-ethyl-hexyl phthalate is replaced by di-cyclo-hexyl phthalate.

In making the compositions of these examples the synthetic rubber is milled e. g. for 7½ minutes at 20 to 30° C. with the nip of the rolls set at 0.015 inch, and is then soaked in the mixture of ketones for at least 48 hours, after which it is mixed for about 30 minutes in a Werner-Pfleiderer, then the plasticisers are added and mixing continued for a further 2 hours. Finally, not more than 24 hours before use, the compounding ingredients are mixed in, the accelerators last.

With cellulose acetate fibre, excellent results have been obtained using as the backing-fabric a fabric of cotton or other form of cellulose, including regenerated cellulose. Fabrics of high tenacity regenerated cellulose such as is obtainable by saponifying cellulose acetate yarn that has been stretched considerably in steam or hot water are particularly suitable when a strong lightweight backing fabric is required. Backing fabrics of other materials can be used, including materials of higher dielectric constant and dielectric strength and lower moisture regain than cotton, for example silk, wool, casein, soya-bean protein and other proteinaceous fibres; cellulose acetate; fibre-forming condensation polymers such as nylon; fibre-forming addition polymers such as copolymers of vinyl chloride with vinyl acetate, with vinylidene chloride, or with acrylonitrile, or of acrylonitrile with methacrylonitrile; and mineral fibre-forming materials such as glass. Instead of using a fabric for the backing material, other flexible non-metallic webs can be used, e. g. webs of paper or films of regenerated cellulose or of a cellulose ester or ether (e. g. the acetate, propionate, acetate-propionate or acetate-butyrate, or ethyl cellulose) or of any of the synthetic polymers referred to above. Metal fabrics or foils can also be used.

With a backing web made of or containing cellulose acetate the staple fibre used may be composed of any of the materials specified above with reference to the backing fabric. Excellent products have been obtained with staple fibre of length between 0.5 and 5 mm., and especially between 0.5 and 2 mm. and of denier 2.5 to 5. The fibre should be free from oil and substantially dry.

The invention includes the use of cellulose acetate fibres in admixture with other fibres, and the use as the backing of mixed fabrics, e. g. fabrics containing yarns of cellulose acetate in admixture with yarns of any other of the fibre-forming materials referred to above. The backing fabric may be composed of continuous filament yarns; or of staple-fibre yarns; or of a mixture of the two. When the backing fabric is composed wholly or for the most part of a fibre-forming material to which the adhesive does not stick as readily as it does to cellulose acetate, it is of advantage to employ that material in the form of a staple fibre yarn or at least to have picks or warps of such yarn at intervals in the fabric. Similarly with such a material it is of advantage to interweave cellulose acetate yarns at intervals.

The best results have been obtained with a cellulose acetate fibre and a backing of a cellulose acetate woven fabric, e. g. a jappe, taffeta, poplin or satin fabric. A novel purpose to which pile fabrics made from such a combination can be put is in making eiderdowns and like coverlets having a reduced tendency to slip.

Products particularly useful for trimmings, e. g. in millinery, and products useful as furnishing fabrics, can be made by bonding cellulose acetate fibre to a film or foil of cellulose acetate. Owing to the poor specific adhesive properties of cellulose acetate towards most adhesives, the manufacture of such materials has hitherto presented serious difficulty. It will, of course, be understood that materials having a backing of film or foil will not possess the soft handle referred to above as one of the advantages obtainable by the present invention when using fabric backings.

The pile surfaced materials of the invention are preferably made by a continuous process in which the web which is to form the backing, in the course of its travel past a number of successive stations, receives a coating of adhesive in sticky condition or as a solution or dispersion which is made sticky by evaporation before the fibre-applying station is reached; has projected on to this coating the fibre required to form the pile; is carried through a region in which the adhesive is hardened by vulcanisation of the copolymer and evaporation of any substantial remaining quantities of volatile substances; and is collected without damaging the pile. The projection of the fibre on to the fabric may be done by means of an air blast or under the impulsion of a constant or varying electric field of high potential in which the fibres become charged. Vulcanisation is preferably effected by carrying the material in festoons through a heated chamber.

The following example illustrates the production of pile surfaced fabric according to the invention:

*Example IV*

A plain woven fabric of continuous filament cellulose acetate yarn of weight 2 to 3 oz./sq. yd. is drawn horizontally past a coating station, where a coating of the composition of Example II is applied and spread by a flexible doctor blade to leave a layer 0.005 inch thick, through a cabinet in which the volatile solvents are evaporated, and then downwards through an electrostatic plate condenser the plates of which are parallel to and extend across the whole width of the fabric and are ½ inch apart, and thence horizontally again through a vulcanising chamber. To the condenser is applied on alternating voltage of the order of 10,000 volts at a frequency of the order of 10 cycles per second through a transformer fed by an A. C. generator driven by a variable speed D. C. motor. To avoid sparking in the condenser at least one of its plates should be covered on the inside by a layer of insulating material, e. g. a sheet of polyvinyl chloride or polystyrene. Dry, oil-free cellulose acetate fibre of length 0.5 to 1 mm. and denier 2.5 to 5 is fed into the space between the adhesive coated surface of the fabric and the adjacent condenser plate and the speed of the motor driving the generator is adjusted to give a frequency which causes the fibres to move to and fro between the coated surface and the adjacent electrode while falling under gravity, until they become impaled on the surface or fall clear.

The vulcanising cabinet is kept at a temperature of 85 to 95° C. and the fabric runs through it in festoons in the course of 15 to 20 hours. In this period the synthetic rubber is vulcanised and most of the dimethyl phthalate is evaporated leaving the coating flexible and non-sticky.

*Example V*

The process is carried out as described in Example IV but substituting for the adhesive the composition of Example III.

Having described our invention, what we desire to secure by Letters Patent is:

1. In a process for making pile-surfaced material by causing loose cellulose acetate fibers to adhere to an adhesive-coated surface of a travelling web and hardening the adhesive, the steps of coating the web with an adhesive having a basis of a synthetic rubber which is a copolymer of butadiene with at least 25% of its weight of acrylonitrile, said adhesive containing also vulcanizing ingredients for the synthetic rubber together with a plasticizer for cellulose acetate having a vapor pressure at 150° C. of at least 5 mm. and a plasticizer for the synthetic rubber of vapor pressure no greater than one fifth that of the first-mentioned plasticizer, applying the fibre to the coated web, carrying the web through a heated zone and in said zone vulcanizing the synthetic rubber and evaporating the greater part of the more volatile plasticizer.

2. In a process for making pile-surfaced material by causing loose cellulose acetate fibres to adhere to an adhesive-coated surface of a travelling web and hardening the adhesive, the steps of coating the web with an adhesive having a basis of synthetic rubber which is a copolymer of butadiene with at least 25% of its weight of acrylonitrile, said adhesive containing also vulcanizing ingredients for the synthetic rubber together with dimethyl phthalate and a plasticizer for the synthetic rubber of vapor pressure no greater than one fifth that of dimethyl phthalate, applying the fibre to the coated web, carrying the web through a heated zone, and in said zone vulcanizing the synthetic rubber and evaporating the greater part of the dimethyl phthalate.

3. In a process for making pile-surfaced material by causing loose cellulose acetate fibres to adhere to an adhesive-coated surface of a travelling web and hardening the adhesive, the steps of coating the web with an adhesive having a basis of a synthetic rubber which is a copolymer of butadiene with at least 25% of its weight of acrylonitrile, said adhesive containing also vulcanizing ingredients for the synthetic rubber together with dimethyl phthalate and di-2-ethyl-hexyl phthalate, applying the fibre to the coated web, carrying the web through a heated zone, and in said zone vulcanizing the synthetic rubber and evaporating the greater part of the dimethyl phthalate.

4. In a process for making pile-surfaced material by causing loose cellulose acetate fibres to adhere to an adhesive-coated surface of a travelling web and hardening the adhesive, the steps of coating the web with an adhesive having a basis of a synthetic rubber which is a copolymer of butadiene with at least 25% of its weight of acrylonitrile, said adhesive containing also vulcanizing ingredients for the synthetic rubber together with dimethyl phthalate and di-cyclo-hexyl phthalate, applying the fibre to the coated web, carrying the web through a heated zone, and in said zone vulcanizing the synthetic rubber and evaporating the greater part of the dimethyl phthalate.

5. In a process for making pile-surfaced material by causing loose cellulose acetate fibres to adhere to an adhesive-coated surface of a travelling web and hardening the adhesive, the steps of coating the web with an adhesive having a basis of a synthetic rubber which is a copolymer of butadiene with at least 25% of its weight of acrylonitrile, said adhesive containing also vulcanizing ingredients for the synthetic rubber together with dimethyl phthalate, di-2-ethyl-hexyl phthalate and a cumarone resin, applying the fibre to the coated web, carrying the web through a heated zone, and in said zone vulcanizing the synthetic rubber and evaporating the greater part of the dimethyl phthalate.

6. In a process for making pile-surfaced material by causing loose cellulose acetate fibres to adhere to an adhesive-coated surface of a travelling web and hardening the adhesive, the steps of coating the web with an adhesive having a basis of a synthetic rubber which is a copolymer of butadiene with at least 25% of its weight of acrylonitrile, said adhesive containing also vulcanizing ingredients for the synthetic rubber together with dimethyl phthalate, di-2-ethyl-hexyl phthalate and a resinous copolymer of $\beta$-methyl styrene and indene, applying the fibre to the coated web, carrying the web through a heated zone, and in said zone vulcanizing the synthetic rubber and evaporating the greater part of the more volatile plasticizer.

7. In a process for making pile-surfaced material by causing loose cellulose acetate fibres to adhere to an adhesive-coated surface of a travelling web and hardening the adhesive, the steps of coating the web with a solution in a mixture of methyl ethyl ketone and methyl isobutyl ketone of an adhesive having a basis of a synthetic rubber which is a copolymer of butadiene with at least 25% of its weight of acrylonitrile, said adhesive containing also vulcanizing ingredients for the synthetic rubber together with dimethyl phthalate, di-2-ethyl-hexyl phthalate and a cumarone resin, evaporating off the methyl ethyl ketone and methyl isobutyl ketone, applying the fibre to the coated web, carrying the web through a heated zone, and in said zone vulcanizing the synthetic rubber and evaporating the greater part of the dimethyl phthalate.

8. In a process for making pile-surfaced material by causing loose cellulose acetate fibres to adhere to an adhesive-coated surface of a travelling web and hardening the adhesive, the steps of coating the web with a solution in a mixture of methyl ethyl ketone and methyl isobutyl ketone of an adhesive having a basis of a synthetic rubber which is a copolymer of butadiene with at least 25% of its weight of acrylonitrile, said adhesive containing also vulcanizing ingredients for the synthetic rubber together with dimethyl phthalate, di-2-ethyl-hexyl phthalate and a resinous copolymer of $\beta$-methyl styrene and indene, evaporating off the methyl ethyl ketone and methyl isobutyl ketone, applying the fibre to the coated web, carrying the web through a heated zone, and in said zone vulcanizing the synthetic rubber and evaporating the greater part of the dimethyl phthalate.

References Cited in the file of this patent

UNITED STATES PATENTS

| Number | Name | Date |
|---|---|---|
| 2,087,260 | Miller | July 20, 1937 |
| 2,187,140 | Faris et al. | Jan. 16, 1940 |
| 2,222,539 | Meston | Nov. 19, 1940 |
| 2,303,202 | Faris et al. | Nov. 24, 1942 |
| 2,459,874 | Fay | Jan. 25, 1949 |
| 2,462,029 | Perry | Feb. 15, 1949 |
| 2,471,870 | Gidley | May 31, 1949 |
| 2,494,848 | Whitelegg | Jan. 17, 1950 |
| 2,567,327 | Ewing | Sept. 11, 1951 |